(12) United States Patent
Ren et al.

(10) Patent No.: US 11,057,966 B2
(45) Date of Patent: Jul. 6, 2021

(54) DEVICE AND METHOD FOR PLASMA ARC MELTING THROUGH MAGNETOSTATIC SOFT-CONTACT STIRRING AND COMPOUNDING

(71) Applicant: Shanghai University, Shanghai (CN)

(72) Inventors: Zhongming Ren, Shanghai (CN); Jianbo Yu, Shanghai (CN); Xia Li, Shanghai (CN); Fan Yang, Shanghai (CN); Liang Liu, Shanghai (CN); Yujia Zhang, Shanghai (CN); Yang Kong, Shanghai (CN)

(73) Assignee: Shanghai University, Shanghai (CN)

( * ) Notice: Subject to any disclaimer, the term of this patent is extended or adjusted under 35 U.S.C. 154(b) by 185 days.

(21) Appl. No.: 16/502,497

(22) Filed: Jul. 3, 2019

(65) Prior Publication Data
US 2020/0084843 A1    Mar. 12, 2020

(30) Foreign Application Priority Data
Jul. 4, 2018 (CN) .......................... 201810729372.6

(51) Int. Cl.
*H05B 7/00* (2006.01)
*H05B 6/24* (2006.01)
(Continued)

(52) U.S. Cl.
CPC ................. *H05B 6/24* (2013.01); *C22B 9/20* (2013.01)

(58) Field of Classification Search
CPC ... H05B 6/24; H05B 6/26; H05B 7/00; H05B 7/08; H05B 7/18; H05B 7/20;
(Continued)

(56) References Cited

U.S. PATENT DOCUMENTS 3,147,329 A * 9/1964 Gage ........................ H05H 1/34
                                                          373/22
3,326,820 A * 6/1967 Cumo et al. ............. B01J 19/00
                                                          252/478
(Continued)

FOREIGN PATENT DOCUMENTS

CN          202517018 U      11/2012
CN          107746999 B       3/2018

*Primary Examiner* — Hung D Nguyen
(74) *Attorney, Agent, or Firm* — Troutman Pepper Hamilton Sanders LLP; Christopher C. Close, Jr.

(57) ABSTRACT

The present invention discloses a device for plasma arc melting through magnetostatic soft-contact stirring and compounding, which includes a furnace body, where a water-cooled copper crucible and a tungsten electrode are mounted in the furnace body, the tungsten electrode is located above the water-cooled copper crucible, and a groove for containing a metal raw material is opened in the water-cooled copper crucible; and a drive shaft penetrates through a side wall of the water-cooled copper crucible, one end, located at the exterior of the water-cooled copper crucible, of the drive shaft is connected with a stepper motor, one end, located in the water-cooled copper crucible, of the drive shaft is sleeved with two rotary tables, magnets having reverse magnetisms are interleaved in the rotary table, and the rotary tables are located on two sides of the groove.

5 Claims, 1 Drawing Sheet

(51) Int. Cl.
*C22B 9/20* (2006.01)
*H05B 6/34* (2006.01)

(58) Field of Classification Search
CPC . C22B 9/003; C22B 9/20; F27D 11/08; F27D 2099/0021; F27B 14/04; F27B 14/14; Y02P 10/20; Y02P 10/212; Y02P 10/25; Y02P 10/286
USPC ..... 373/18, 21, 22, 23, 24, 25, 26, 146, 156
See application file for complete search history.

(56) References Cited

U.S. PATENT DOCUMENTS

| | | | | |
|---|---|---|---|---|
| 4,263,468 A * | 4/1981 | Primke | ................... | H05B 7/00 |
| | | | | 373/22 |
| 8,599,899 B2 * | 12/2013 | Koriyama | ........... | C22B 21/0084 |
| | | | | 373/146 |
| 10,190,825 B2 * | 1/2019 | Zhang | ...................... | H05B 7/18 |
| 2006/0001200 A1 * | 1/2006 | Takahashi | ............... | F27D 27/00 |
| | | | | 266/234 |

* cited by examiner

DEVICE AND METHOD FOR PLASMA ARC MELTING THROUGH MAGNETOSTATIC SOFT-CONTACT STIRRING AND COMPOUNDING

TECHNICAL FIELD

The present invention relates to the field of plasma arc melting technologies, and in particular, to a device and method for plasma arc melting through magnetostatic soft-contact stirring and compounding.

BACKGROUND

Plasma arc melting is employed to melt and refine metals by utilizing concentrated and controllably stabilized plasma arc generated between an electrode and a raw material as a heat source. The plasma has high conductivity, heat capacity and thermal conductivity. The plasma arc is an arc of folding and has concentrated energy, slender arc column and temperature generally in a range of 5000-30000 K. The plasma arc melting can effectively control atmosphere in the furnace, where the most commonly used inert gas is argon, and the atmosphere in the furnace can be changed according to different requirements to melt special metal or alloy.

A plasma arc melting process mostly utilizes a water-cooled copper crucible, where metal at the bottom of the crucible is directly in contact with the water-cooled copper crucible to cause rapid heat dissipation and then cannot reach its melting temperature such that the metal at the bottom of the crucible keeps a solid state while the metal at the upper portion thereof is in a molten state. If the metal at the bottom of the crucible needs to conduct the plasma arc melting, it should be turned over to be remelted so as to prolong melting time and costs. Another method is to utilize mechanical stirring, for example, the water-cooled copper crucible is replaced with rotating rollers, and depending on the friction force between the rotating rollers and unmelted metal at the bottom, the metal at the bottom is turned over; however, a device utilized by such method has a complex structure and high costs, and the rotating rollers should be in precise fit.

SUMMARY

An objective of the present invention is to provide a device and method for plasma arc melting through magnetostatic soft-contact stirring and compounding to solve the problems in the prior art, where an objective of melting unmelted metal at the bottom of a water-cooled copper crucible is achieved by the magnetostatic soft-contact stirring without using turning over metal.

To achieve the above objective, the present invention provides the following solution.

The present invention provides a device for plasma arc melting through magnetostatic soft-contact stirring and compounding, which includes a furnace body, where a water-cooled copper crucible and a tungsten electrode are mounted in the furnace body, the tungsten electrode is located above the water-cooled copper crucible, and a groove for containing a metal raw material is opened in the water-cooled copper crucible; and a drive shaft penetrates through a side wall of the water-cooled copper crucible, one end, located at the exterior of the water-cooled copper crucible, of the drive shaft is connected with a stepper motor, one end, located in the water-cooled copper crucible, of the drive shaft is sleeved with two rotary tables, magnets having reverse magnetisms are interleaved in the rotary table, and the rotary tables are located on two sides of the groove.

Optionally, the two rotary tables are fixed to the drive shaft in a splayed shape.

Optionally, an included angle between the two rotary tables is 60 degrees.

Optionally, a plurality of same mounting slots are opened in a side face of the rotary table around the center, and the magnet is embedded in the mounting slot of the rotary table.

The present invention further provides a method for plasma arc melting through magnetostatic soft-contact stirring and compounding, which includes the following steps:

Step 1: assembling a device, specifically assembling a furnace body, a tungsten electrode, a water-cooled copper crucible, magnets, rotary tables, a drive shaft and a stepper motor according requirements, and after the assemble is completed, commissioning the device;

Step 2: placing a metal raw material in the water-cooled copper crucible after the commissioning of the device is completed;

Step 3: starting the tungsten electrode to conduct plasma arc melting on the metal raw material in the water-cooled copper crucible; and Step 4: starting the stepper motor to drive the rotary tables on the drive shaft to rotate so as to generate an alternating magnetic field and then to generate an electromagnetic force, where the electromagnetic force is acted on the unmelted metal raw material at the bottom of the water-cooled copper crucible to push the unmelted metal raw material to move such that the unmelted metal raw material at the bottom is in contact with the plasma arc to be melted, and at this time, the melting is completed.

Compared with the prior art, the present invention achieves the following technical effects: the present invention drives the two rotary tables to rotate in the same direction by the stepper motor so as to generate the alternating magnetic field in a plasma arc melting crucible and an induced current in the unmelted metal at the bottom of the crucible, the induced current and the local magnetic field are interacted to generate the electromagnetic force, and the electromagnetic force is acted on the unmelted metal at the bottom of the crucible to push the unmelted metal at the bottom to move such that the unmelted metal at the bottom is in contact with the plasma arc to be melted, thereby achieving an overturning melting objective and solving a defect that the metal at the bottom of the crucible is not melted in a conventional plasma melting process. Additionally, the flowing of a melt under the action of the magnetostatic soft-contact stirring is reinforced so as to be beneficial to homogenization of alloy elements and diffusion of impurity elements and to achieve an objective of uniformly melting the metal.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

Figure 1:
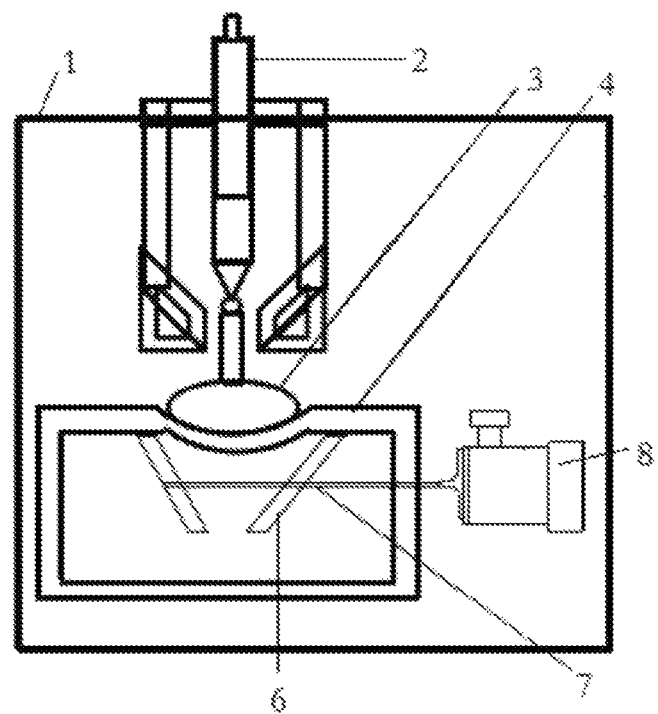
FIG. 1 is a schematic structural diagram of a device for plasma arc melting through magnetostatic soft-contact stirring and compounding of the present invention.
Figure 2:
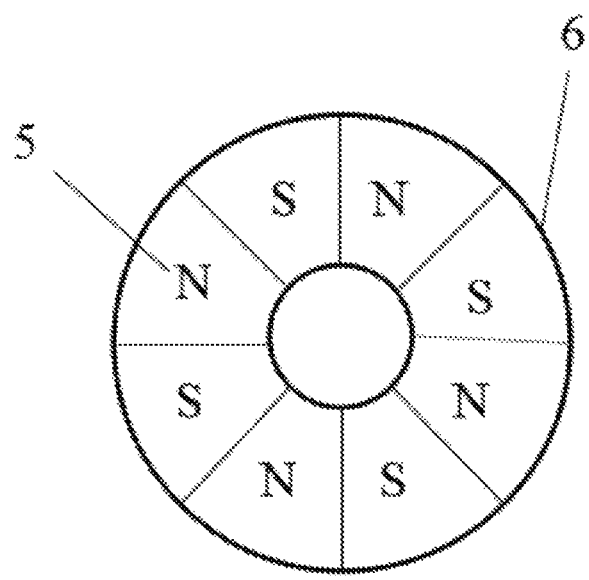
FIG. 2 is a schematic structural diagram of a rotary table of a device for plasma arc melting through magnetostatic soft-contact stirring and compounding of the present invention.

In the drawings: 1-furnace body, 2-tungsten electrode, 3-metal raw material, 4-water-cooled copper crucible, 5-magnet, 6-rotary table, 7-drive shaft, and 8-stepper motor.

DETAILED DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide a device and method for plasma arc melting through magnetostatic soft-contact stirring and compounding to solve the problems in the prior art, where an objective of melting unmelted metal at the bottom of a water-cooled copper crucible is achieved by the magnetostatic soft-contact stirring without using turning over metal.

To make the foregoing objective, features, and advantages of the present invention clearer and more comprehensible, the present invention is further described in detail below with reference to the accompanying drawings and specific embodiments.

The present invention provides a device and method for plasma arc melting through magnetostatic soft-contact stirring and compounding, the device mainly includes a furnace body 1, a water-cooled copper crucible 4 and a tungsten electrode 2 are mounted in the furnace body 1, the tungsten electrode 2 is located above the water-cooled copper crucible 4, and a groove for containing a metal raw material 3 is opened in the water-cooled copper crucible 4; and a drive shaft 7 penetrates through a side wall of the water-cooled copper crucible 4, one end, located at the exterior of the water-cooled copper crucible 4, of the drive shaft 7 is connected with a stepper motor 8, one end, located in the water-cooled copper crucible 4, of the drive shaft 7 is sleeved with two rotary tables 6, magnets 5 having reverse magnetisms are interleaved in the rotary table 6, and the rotary tables 6 are located on two sides of the groove. The two rotary tables 6 are fixed to the drive shaft 7 in a splayed shape, and an included angle between the two rotary tables 6 is 60 degrees. A plurality of same mounting slots are opened in a side face of the rotary table 6 around the center, and the magnet 5 is embedded in the mounting slot of the rotary table 6.

A melting method utilizing the above device for plasma arc melting through magnetostatic soft-contact stirring and compounding provided by the present invention mainly includes: the metal raw material 3 is melted by plasma arc between the tungsten electrode 2 and the metal raw material 3, the stepper motor 8 drives the two rotary tables 6 to rotate in the same direction in a melting process so as to generate an alternating magnetic field in the water-cooled copper crucible 4 and an induced current in the unmelted metal raw material at the bottom of the crucible, the induced current and the local magnetic field are interacted to generate an electromagnetic force, and the electromagnetic force is acted on the unmelted metal at the bottom of the crucible to push the unmelted metal at the bottom to move such that the unmelted metal at the bottom is in contact with the plasma arc to be melted, thereby achieving an overturning melting objective. In the present invention, a side wall of an upper portion of a connection part of the water-cooled copper crucible 4 and the drive shaft 7 is hollow, and one end is provided with a water inlet while the other end is provided with a water outlet so as to achieve a water cooling objective.

Overall, the present invention utilizes the magnetostatic soft-contact stirring to generate the induced current in the metal raw material in the water-cooled copper crucible 4, the induced current and the local magnetic field are interacted to generate the electromagnetic force, and the electromagnetic force is acted on the unmelted metal at the bottom of the groove of the water-cooled copper crucible 4 so as to push the metal to move, and when the unmelted metal at the bottom is in contact with the plasma arc to be melted, the overturning melting objective is achieved, and a defect that the metal at the bottom of the crucible is not melted in a conventional plasma melting process is solved; and additionally, the flowing of a melt under the action of the magnetostatic soft-contact stirring is reinforced so as to be beneficial to homogenization of alloy elements and diffusion of impurity elements and to achieve an objective of purifying and homogenizing the metal. Mechanical stirring is replaced with the magnetostatic soft-contact stirring, the original plasma arc melting device is changed a little, and the device is simple and is easy to be achieved; metal raw material overturning secondary refining is replaced with the magnetostatic soft-contact stirring so as to improve efficiency and reduce costs; and the magnetostatic soft-contact stirring effectively reinforces the flowing of the melt and is beneficial to element alloying during alloy refining.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

What is claimed is:

1. A device for plasma arc melting through magnetostatic soft-contact stirring and compounding, wherein the device comprises a furnace body, a water-cooled copper crucible and a tungsten electrode are mounted in the furnace body, the tungsten electrode is located above the water-cooled copper crucible, and a groove for containing a metal raw material is opened in the water-cooled copper crucible; and a drive shaft penetrates through a side wall of the water-cooled copper crucible, one end, located at the exterior of the water-cooled copper crucible, of the drive shaft is connected with a stepper motor, one end, located in the water-cooled copper crucible, of the drive shaft is sleeved with two rotary tables, magnets having reverse magnetisms are interleaved in the rotary table, and the rotary tables are located on two sides of the groove.

2. The device for plasma arc melting through magnetostatic soft-contact stirring and compounding according to claim 1, wherein the two rotary tables are fixed to the drive shaft in a splayed shape.

3. The device for plasma arc melting through magnetostatic soft-contact stirring and compounding according to claim 2, wherein an included angle between the two rotary tables is 60 degrees.

4. The device for plasma arc melting through magnetostatic soft-contact stirring and compounding according to claim 3, wherein a plurality of same mounting slots are opened in a side face of the rotary table around the center, and the magnet is embedded in the mounting slot of the rotary table.

5. A method for plasma arc melting through magnetostatic soft-contact stirring and compounding, wherein the method comprises the following steps:

step 1: assembling a device, specifically assembling a furnace body, a tungsten electrode, a water-cooled copper crucible, magnets, rotary tables, a drive shaft and a stepper motor according requirements, and after the assemble is completed, commissioning the device;

step 2: placing a metal raw material in the water-cooled copper crucible after the commissioning of the device is completed;

step 3: starting the tungsten electrode to conduct plasma arc melting on the metal raw material in the water-cooled copper crucible; and step 4: starting the stepper motor to drive the rotary tables on the drive shaft to rotate so as to generate an alternating magnetic field and then to generate an electromagnetic force, wherein the electromagnetic force is acted on the unmelted metal raw material at the bottom of the water-cooled copper crucible to push the unmelted metal raw material to move such that the unmelted metal raw material at the bottom is in contact with the plasma arc to be melted, and at this time, the melting is completed.

* * * * *